United States Patent
Tsai

[11] Patent Number: 6,138,977
[45] Date of Patent: Oct. 31, 2000

[54] CHRISTMAS TREE FOLDING PEDESTAL

[76] Inventor: Yuan-Hui Tsai, No. 56, Tzyh-Li Rd. I, Nankan Industri Dis., Nantou, Taiwan

[21] Appl. No.: 09/127,874

[22] Filed: Aug. 3, 1998

[51] Int. Cl.$^7$ .................................................. F16M 13/00
[52] U.S. Cl. .......................................... 248/523; 248/529
[58] Field of Search ..................... 248/523, 528, 248/529, 188.7, 167, 440.1, 188.6, 513, 514, 516, 519, 527

[56] References Cited

U.S. PATENT DOCUMENTS

| | | | | |
|---|---|---|---|---|
| D. 342,694 | 12/1993 | Frost | ................................... | D11/130.1 |
| 4,406,437 | 9/1983 | Wright | ..................................... | 248/529 |
| 4,712,758 | 12/1987 | Cuschera | ............................... | 248/188.7 |
| 4,763,866 | 8/1988 | Sinchok | ................................. | 248/188.7 |
| 5,290,004 | 3/1994 | Frost et al. | ................................ | 248/528 |
| 5,871,185 | 2/1999 | Phillips et al. | ........................... | 248/167 |

*Primary Examiner*—Ramon O. Ramirez
*Attorney, Agent, or Firm*—Bacon & Thomas PLLC

[57] ABSTRACT

A Christmas tree pedestal, includes a main body and a secondary body wherein the main body forms an inner sleeve portion and a first outer sleeve portion, and the secondary body forms a second outer sleeve portion. The inner sleeve portion of the body is received within the second outer sleeve portion of the secondary body whereby the main body and the secondary body are capable of being freely rotated over 90 degrees with regard to each other for folding a plurality of first and second supporting legs of the main body and the secondary body together in a limited space for transportation, storage, delivery and packing thereof.

4 Claims, 6 Drawing Sheets

CHRISTMAS TREE FOLDING PEDESTAL

BACKGROUND OF THE INVENTION

1. Field of the Invention

The present invention relates to a christmas tree pedestal, particularly to a christmas tree pedestal for supporting an artificial christmas tree.

2. Description of the Related Art

In general, a conventional christmas tree is made from falling a real tree. However, based on ecosystem protection, various artificial christmas trees made of plastic by injection molding continuously appear in the christmas market recently for replacing the real tree. In addition to the advantages of the lower cost and lightness thereof, the artificial christmas tree is capable of being not readily damaged after being repeatedly used for a long time if it is remained in good situation.

Whether the artificial christmas tree is positioned inside or outside the house, it always needs a pedestal to receive a trunk thereof in a straight position. The generic pedestal includes a vertical sleeve, and a number of legs supporting said vertical sleeve whereby the christmas tree can be inserted into the vertical sleeve of the pedestal through a top opening thereof.

Anyway, because the entire pedestal is integrated, it is inconvenient in that the pedestal can not be folded in a small space to facilitate its transportation, storage, delivery and packing by customers. Thus, improvement is needed for most of the pedestal manufacturers.

BRIEF DESCRIPTION OF THE INVENTION

Based on the foregoing disadvantage, it is an objective of this invention to provide an improved christmas tree pedestal capable of being rotatablely folded in a limited space for the convenience of the transportation, storage, delivery and packing thereof.

BRIEF DESCRIPTION OF THE SEVERAL VIEWS OF THE DRAWINGS

In order that the present invention may more readily be understood, the following description is given, merely by way of example with reference to the accompanying drawings, in which.

DETAILED DESCRIPTION OF THE PREFERRED EMBODIMENT

Figure 1:
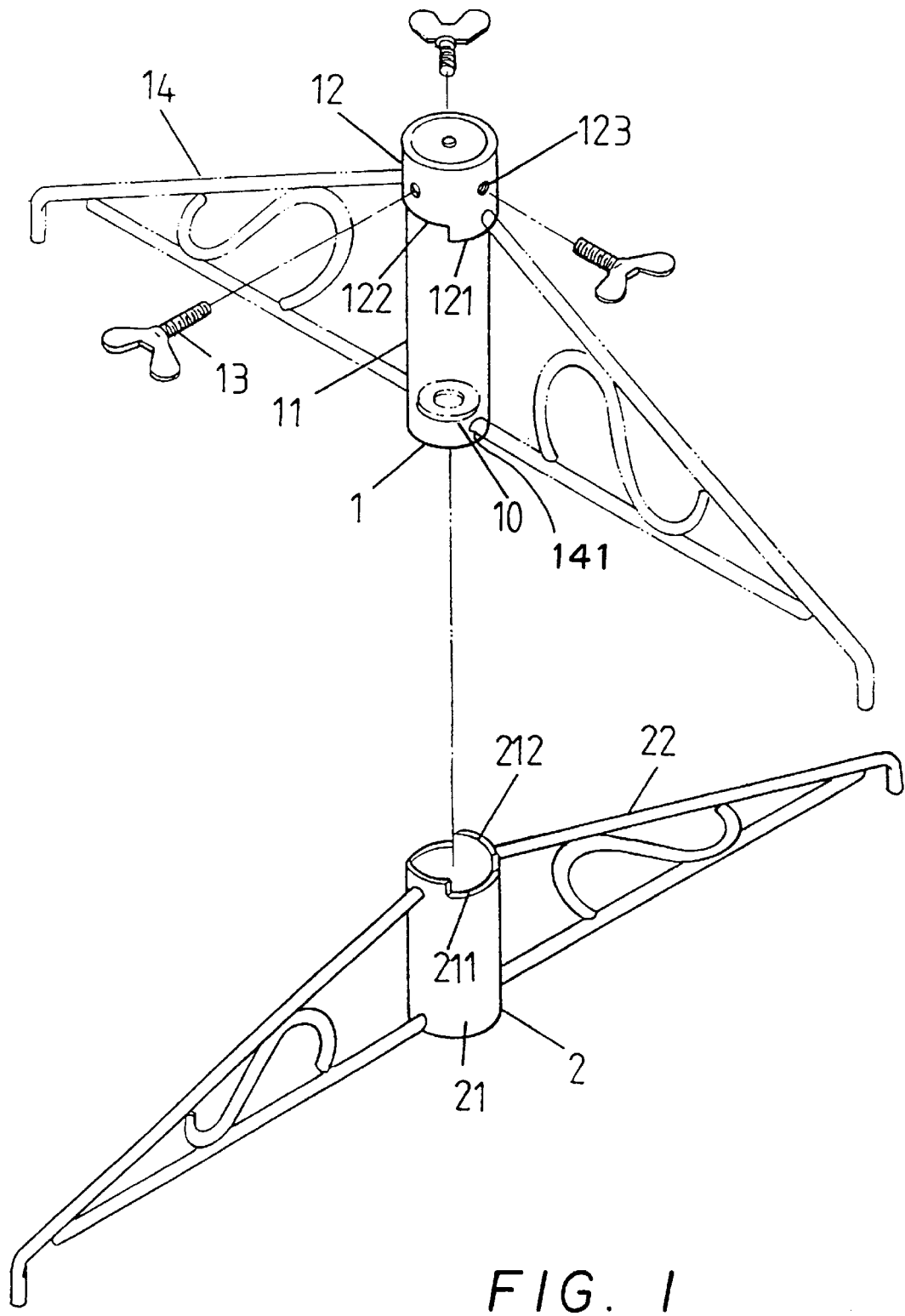
FIG. 1 is an exploded perspective view of a christmas tree pedestal in accordance with the present invention.

Referring to the perspective view shown in FIG. 1, a pedestal in accordance with the present invention includes a main body 1 and a secondary body 2. The main body 1 is further defined with an inner sleeve portion 11 which encloses a pad firmly disposed on an inner end thereof. A first outer sleeve portion 12 receives therein a top portion of the inner sleeve portion 11, and forms a plurality of symmetric and spaced top tab portions 121 and a plurality of symmetric and spaced top notch portions 122 all which are arranged on a bottom edge thereof. A plurality of screw holes 123 defined on the first outer sleeve portion 12 are spaced and symmetrical for firm reception of associated bolts 13. A number of symmetrical first supporting legs 14 are disposed outside the inner sleeve portion 11.

The secondary body 2 includes a second outer sleeve portion 21 having a diameter that is larger than that of the inner sleeve portion 11. In correspondence to the top tab portions 121 and top notch portions 122 of the first outer sleeve portion 12, the secondary body 2 forms the bottom concave portions 211 and bottom convex portions 212. Similarly, a number of symmetrical second supporting legs 22 are disposed outside the second outer sleeve portion 21.

Figure 2:
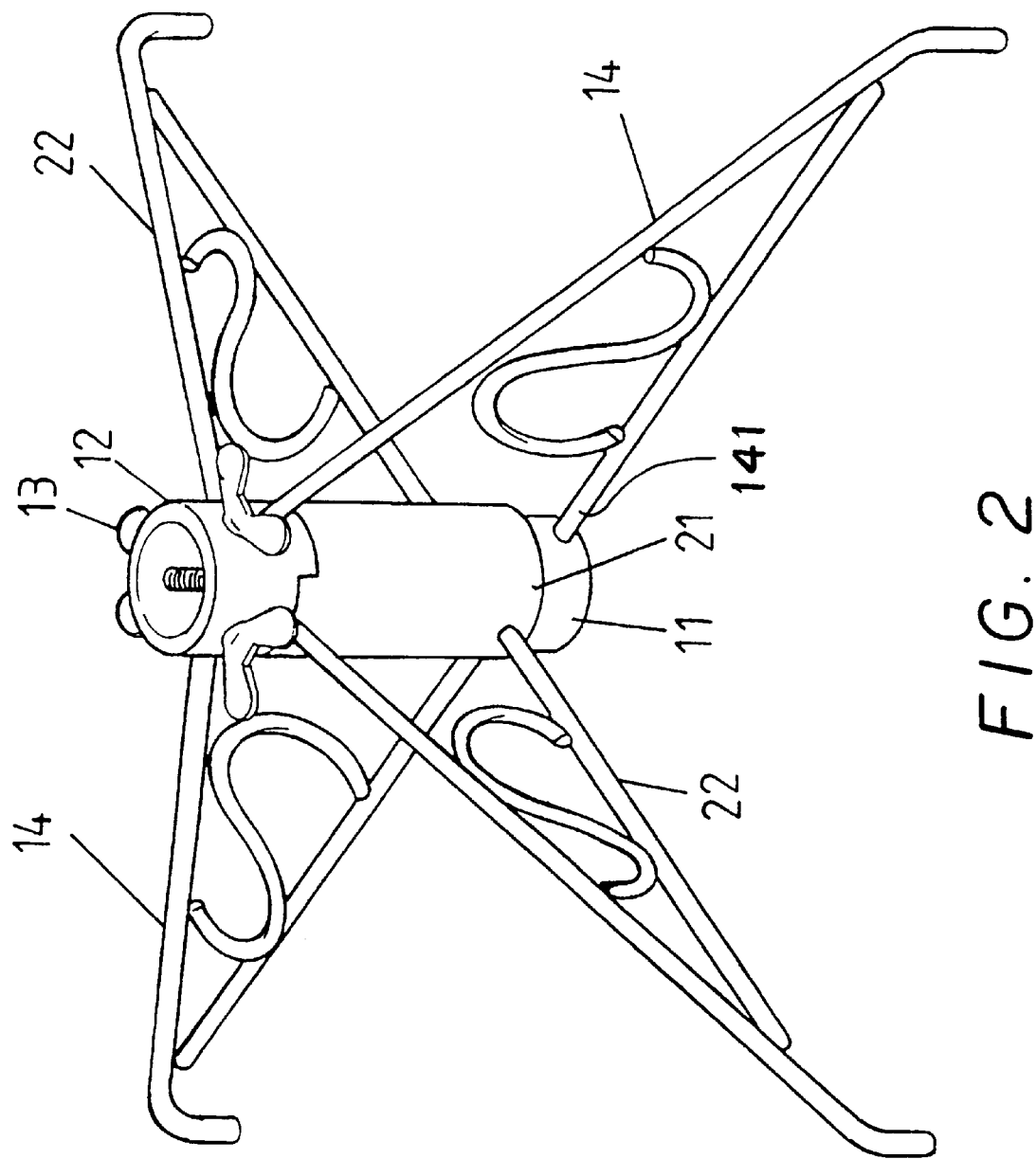
FIG. 2 is a assembled perspective view of the christmas tree pedestal shown in FIG. 1.

In assembly, the inner sleeve portion 11 of the main body 1 is first received within second outer sleeve portion 21 of the secondary body 2 by insertion while the first supporting legs 14 are not yet oriented. Then, the main body 1 can be rotated to facilitate the orientation of said first supporting legs 14 as shown in FIG. 2 until the top tab portions 121 and top notch portions 122 of the first outer sleeve portion 12 and the bottom tab portions 211 and bottom convex portions 212 of the second outer sleeve portion 21 are locked with each other.

Figure 3A:
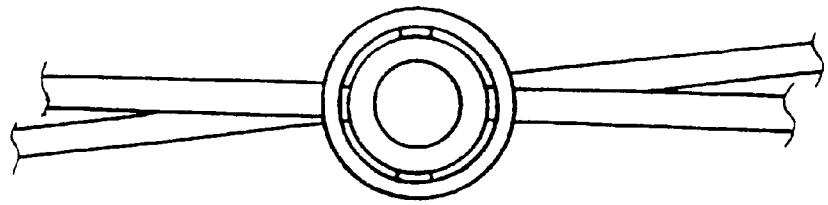
FIG. 3A is a partial top plan view of the pedestal shown in FIG. 4.
Figure 3:
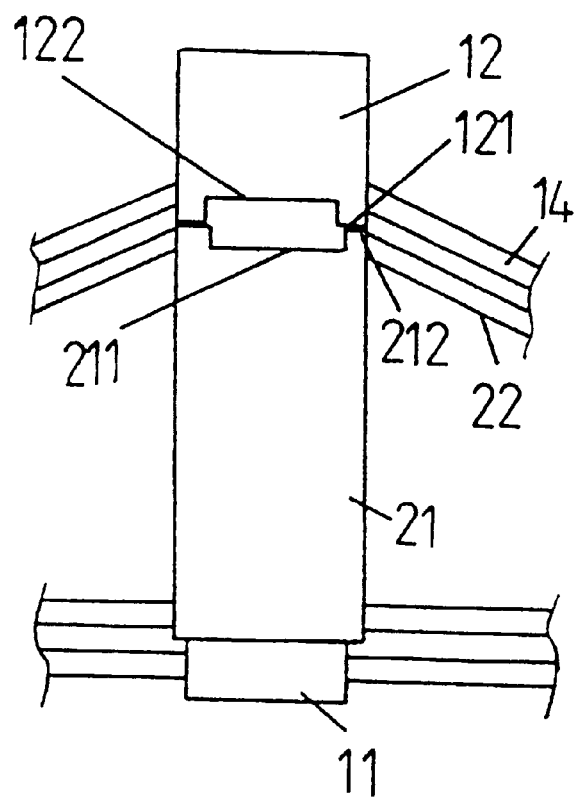
FIG. 3 is a partial side elevational view of the pedestal in a folded position.
Figure 4A:
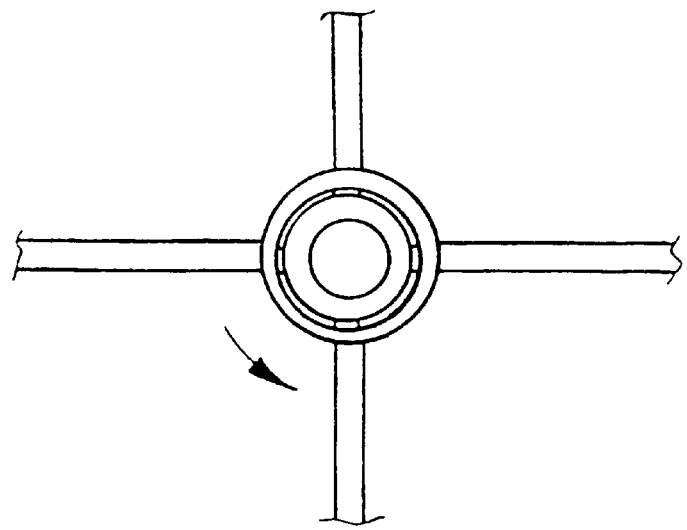
FIG. 4A is a partial top plan view of the pedestal shown in FIG. 5.
Figure 4:
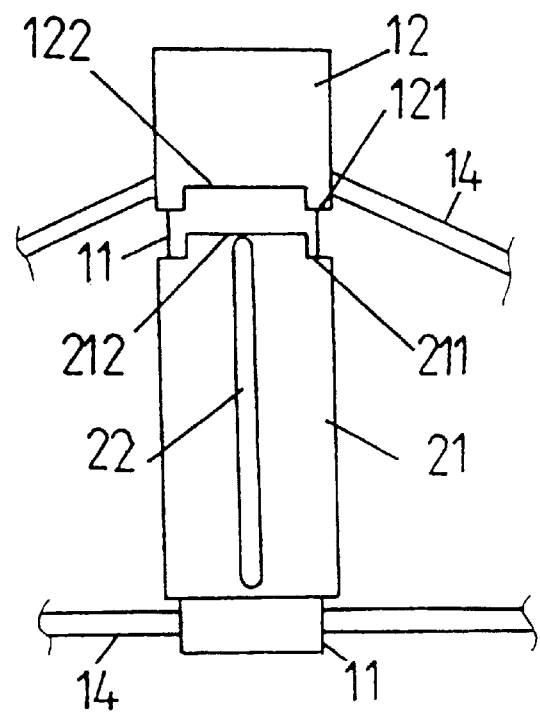
FIG. 4 is a partial side elevational view of the pedestal in an open position.
Figure 5:
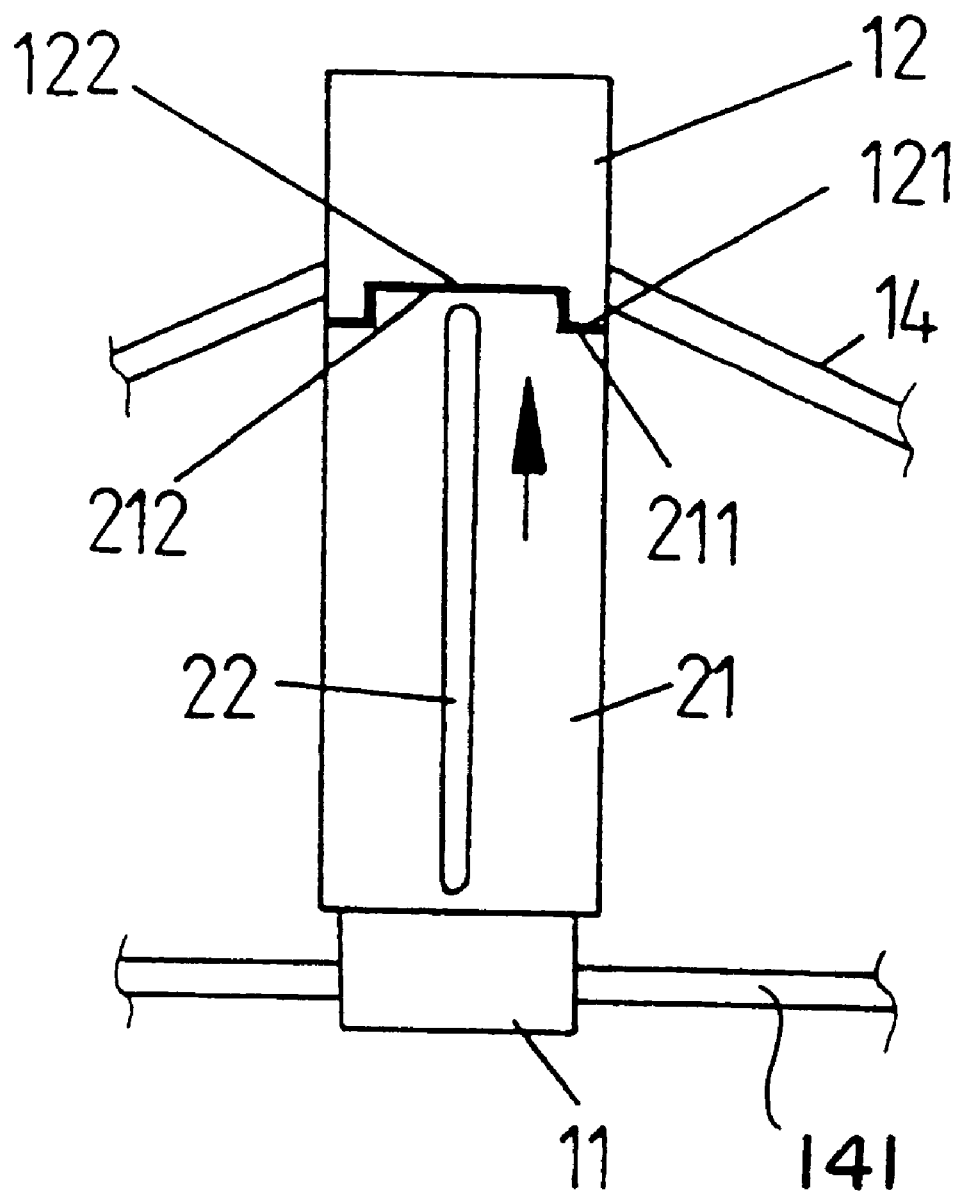
FIG. 5 is another partial side elevational view of the pedestal.

In folding the pedestal as shown in FIG. 3, the main body 1 and secondary body 2 can be vertically spaced apart from each other in a predetermined distance and then freely rotated 90 degrees with regard to each other and thereby folding the first supporting legs 14 and second supporting legs 22 together in a parallel relationship. At least a portion of at least one of the inner sleeve 11 forms a protuberance 141 for abutting an edge of the outer sleeve 21, such as legs 22 extending from the outer sleeve. In use as shown in FIGS. 3–6, it is similar to said assembly of the pedestal that the main body 1 is reversely rotated 90 degrees with regard to the secondary body 2 thereby aligning the top tab portions 121 and top notch portions 122 of the first outer sleeve portion 12 with the bottom concave portions 211 and bottom tab portions 212 of the second outer sleeve portion 21 for further engaging and locking with each other.

Figure 6:
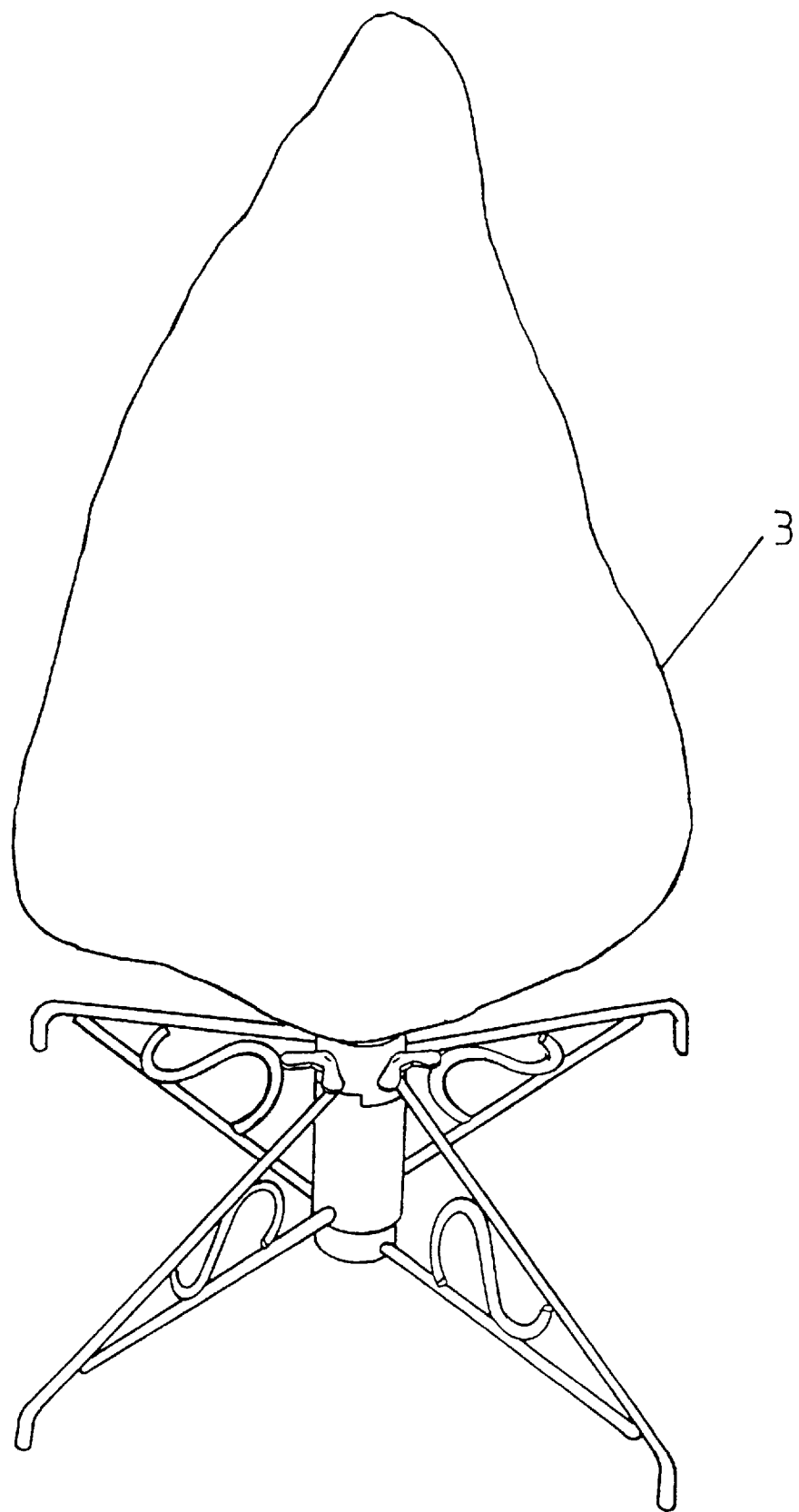
FIG. 6 is a perspective view of the christmas tree pedestal of preferred embodiment in accordance with the present invention showing therein the insertion of a christmas tree into the pedestal.

Finally, a trunk of a christmas tree 3 can be inserted into the inner sleeve portion 11 of the main body 1 and abut against a pad 10 on an inner end of the inner sleeve portion 11 for supporting tree 3. Then, a plurality of bolts 13 are respectively screwed into the trunk of tree 3 to a specific depth through said holes 123 of the first outer sleeve portion 12 as shown in FIG. 6.

In conclusion, it is known that the pedestal in accordance with the present invention is actually advantageous in comparison with the conventional structure for convenience of transportation, storage, delivery and packing thereof.

The present invention may be embodied in other specific forms without departing from its spirit or essential characteristics. The described embodiments are to considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A Christmas tree pedestal comprising:
   a) a main body including an inner sleeve having a top section and a bottom section, a first outer sleeve encasing the top section, the first outer sleeve having a lower portion defining a plurality of circumferentially alternating tabs and notches, and a pair of support legs extending outwardly from opposite sides of the main body;
   b) a secondary body including a second outer sleeve, the second outer sleeve having an upper portion defining a plurality of circumferentially alternating tabs and notches, and a pair of support legs extending outwardly from opposite sides of the secondary body;
   c) the respective tabs and notches of the first and second outer sleeves being disposable in corresponding engagement with each other;
   d) the inner sleeve being slidably and rotatably received within the second outer sleeve for selectively disposing the pedestal in an assembled condition for supporting a tree wherein the respective tabs and notches of the first and second outer sleeves are in engagement and the support legs are circumferentially spaced 90 degrees from each other, and in a folded condition wherein the respective tabs and notches of the first and second outer sleeves are disengaged and the support legs are parallel to each other; and
   e) a protuberance extending from a bottom portion of the second inner sleeve in the folded conduct for abutting an edge of the outer sleeve.

2. The Christmas tree pedestal of claim 1 wherein said protuberance forms at least a portion of one of the pair of support legs extending from the main body.

3. The Christmas tree pedestal of claim 1, further including:
   a) a plurality of adjustable fasteners engageable through the first outer sleeve for securing the trunk of a Christmas tree inserted through the inner sleeve of the main body; and
   b) the bottom section of the inner sleeve includes a pad for supporting the base of the tree trunk.

4. The Christmas tree pedestal of claim 3 wherein said protuberance forms at least a portion of one of the pairs of support legs extending from the main body.

* * * * *